United States Patent [19]

Brandenburg

[11] Patent Number: 5,894,516

[45] Date of Patent: *Apr. 13, 1999

[54] BROADCAST SOFTWARE DISTRIBUTION

[75] Inventor: Barbara B. Brandenburg, Columbia, S.C.

[73] Assignee: NCR Corporation, Dayton, Ohio

[*] Notice: This patent issued on a continued prosecution application filed under 37 CFR 1.53(d), and is subject to the twenty year patent term provisions of 35 U.S.C. 154(a)(2).

[21] Appl. No.: 08/679,638

[22] Filed: Jul. 10, 1996

[51] Int. Cl.$^6$ ..................................................... H04L 9/00

[52] U.S. Cl. ........................... 380/4; 380/9; 380/21; 380/23; 380/25; 380/49; 380/50; 348/6; 455/3.1; 455/3.2

[58] Field of Search ................................ 380/4, 21, 9, 10, 380/20, 49, 50, 59, 23, 25; 705/26, 27; 348/6, 7, 8, 9, 12; 455/3.1, 3.2, 4.1, 4.2, 5.1, 6.1, 6.3

[56] References Cited

U.S. PATENT DOCUMENTS

| | | | |
|---|---|---|---|
| 5,023,907 | 6/1991 | Johnson et al. | 380/4 |
| 5,034,980 | 7/1991 | Kubota | 380/4 |
| 5,224,166 | 6/1993 | Hartman, Jr. | 380/50 |
| 5,388,158 | 2/1995 | Berson | 380/23 |
| 5,392,351 | 2/1995 | Hasebe et al. | 380/4 |
| 5,400,403 | 3/1995 | Fahn et al. | 380/21 |
| 5,416,840 | 5/1995 | Cane et al. | 380/4 |
| 5,586,186 | 12/1996 | Yuval et al. | 380/30 |
| 5,598,470 | 1/1997 | Cooper et al. | 380/4 |
| 5,694,471 | 12/1997 | Chen et al. | 380/25 |
| 5,754,957 | 5/1998 | Khan | 455/436 |
| 5,761,301 | 6/1998 | Oshima et al. | 380/4 |

*Primary Examiner*—Bernarr E. Gregory
*Attorney, Agent, or Firm*—Gates & Cooper

[57] ABSTRACT

A method, apparatus, and article of manufacture for broadcasting encrypted software to a target computer enables simultaneous transmission to a plurality of licensed target computers. An encryption key is generated to encrypt a software package. The encryption key is then itself encrypted using a target computer identification code, and the encrypted encryption key is loaded onto the target computer. The encrypted software is broadcast, for example, via satellite, and received at the target computer. The target computer uses its identification code to decrypt the encrypted encryption key (i.e., unlock the encryption key). Once the target computer unlocks the encryption key, it uses the encryption key to decrypt the software to be installed on the target computer.

21 Claims, 4 Drawing Sheets

BROADCAST SOFTWARE DISTRIBUTION

BACKGROUND OF THE INVENTION

1. Field of the Invention

This invention relates in general to broadcast distribution, and in particular, to broadcast software distribution using encryption key locking and unlocking procedures.

2. Description of Related Art

The software industry as a whole has experienced tremendous growth in recent years. There is a continuous demand for new software products that address the needs in new or changing industries. Moreover, software companies routinely upgrade previously-released software products in response to specific user needs and/or to provide a product in a more efficient manner.

Software companies have traditionally distributed its software products through physical media such as tapes or diskettes, and, more recently, CD ROM. Companies store their software on these physical media and ship them to customers for installation onto their home computers.

In distributing software by this method, however, various problems have been encountered. The cost of media duplication, shipping, and storage is quite high in many such applications. Moreover, the elimination of many types of such physical media has created unwanted environmental-waste concerns. In addition, this type of distribution involves unwanted delay associated with waiting for media copies, packing, addressing, and shipping to obtain new products or new versions of existing products.

An alternative method of distributing software is through phone lines. Software distribution centers, having a host computer with a modem, transmit the software through phone lines to a customer's computer in response to the customer's order for particular software packages.

This alternative form of distribution has also encountered problems. The number of customers who can receive a given transmission is limited by the physical capabilities of the phone lines. If numerous customers order the same software package, such as when a company distributes an upgraded version to existing subscribers, the software company must repeatedly transmit the same software package until all its customers have received the product. This approach is both costly and time consuming.

Accordingly, there is a need for an improved method and computer system for distributing software that overcomes the above-mentioned deficiencies associated with prior techniques. The present invention provides a solution to these and other problems, offering advantages over conventional implementations.

SUMMARY OF THE INVENTION

To overcome the limitations in the prior art described above, and to overcome other limitations that will become apparent upon reading and understanding the present specification, the present invention provides a unique method, apparatus, and article of manufacture for broadcasting encrypted software to a target computer. In one embodiment of the present invention, an encryption key, which is unique to the particular software package, is used to encrypt the software package, and is then itself encrypted using the unique identification code of the target computer. This key is loaded onto the target computer, to lock the particular software package to the target computer. The software is then broadcast from a send computer and received at the target computer. In a more particular implementation, the software is broadcast via satellite. The target computer obtains the encryption key by decrypting the encryption key using its identification code. The encryption key is then used to decrypt the software to enable the software to be installed onto the target computer.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following detailed description of the drawings, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Figure 1:
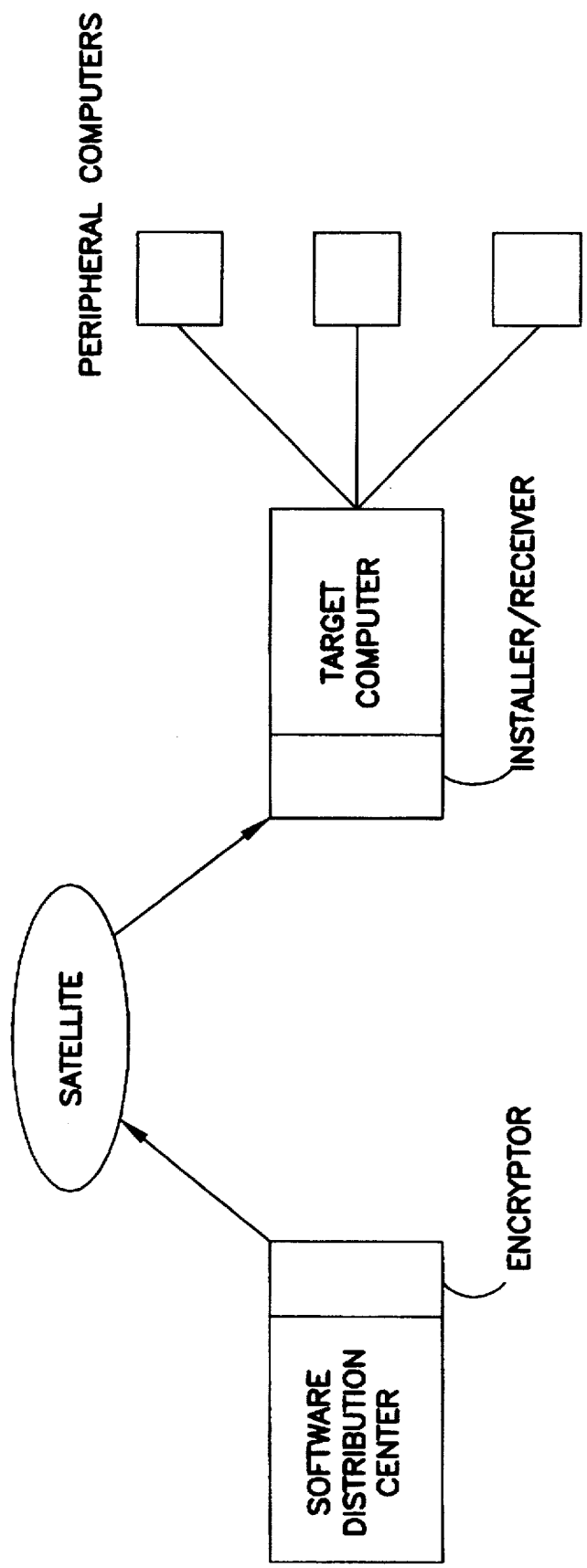
FIG. 1 illustrates an exemplary computer system environment for use in accordance with the present invention.

FIG. 1 illustrates an exemplary computer system environment that can be used in conjunction with the present invention. The exemplary environment includes a host computer 10 and an encryptor 12 at a Software Distribution Center (SDC), a satellite 14 for relaying transmitted software, a target computer 18, and peripheral computers 20a–n which are coupled to the target computer 18. As illustrated, the encryptor 12, which encrypts software packages loaded on the host computer 10, is separate from the host computer 10. It is understood, however, that the encryptor 12 can be configured to be part of the host computer 10.

In the exemplary computer environment of FIG. 1, the target computer 18 contains a licensing software program 22 and a receiver/installer software program 24, which are typically embodied on one or more program storage devices. A customer is licensed or otherwise authorized to use the broadcast service of the present invention. With such authorization, the customer receives the licensing program 22 and receiver/installer 24 program loads these programs onto the computer 18, thereby enabling receipt of software transmitted in accordance with this invention. The licensing program 22 provides for the entry and tracking of strings for all software products purchased. The licensing program 22 also generates the unique computer identifier code (e.g., computer identification number) for the computer 10 that the installer/receiver program 24 runs. As described below, a customer provides this unique identification code whenever it places an order for a software package. The installer/receiver software program 24 enables the target computer 18 to receive software that is broadcasted, for example via satellite 14, and to install the software onto the target computer 18. The peripheral computers 20a–n also contain installer/receiver software.

The host computer 10 in FIG. 1 contains a library of stored software packages that customers may order. For each software package, an encryption key is generated and the software package is encrypted using that encryption key. The encrypted software is then compressed and stored as one packet in a single compressed file. The compressed file also includes a packet which identifies the particular software product included in the file. As described in more detail below in connection with FIGS. 3 and 4, each compressed file further includes a checksum packet which is generated at the time the software package is encrypted and compressed, enabling the target computer 18 to determine whether a software package is transmitted without error. A transmitting program on the host computer 10 contains information regarding the time at which each software package will be transmitted. The transmission and encryption of software are performed using techniques well-known in the art.

Figure 2:
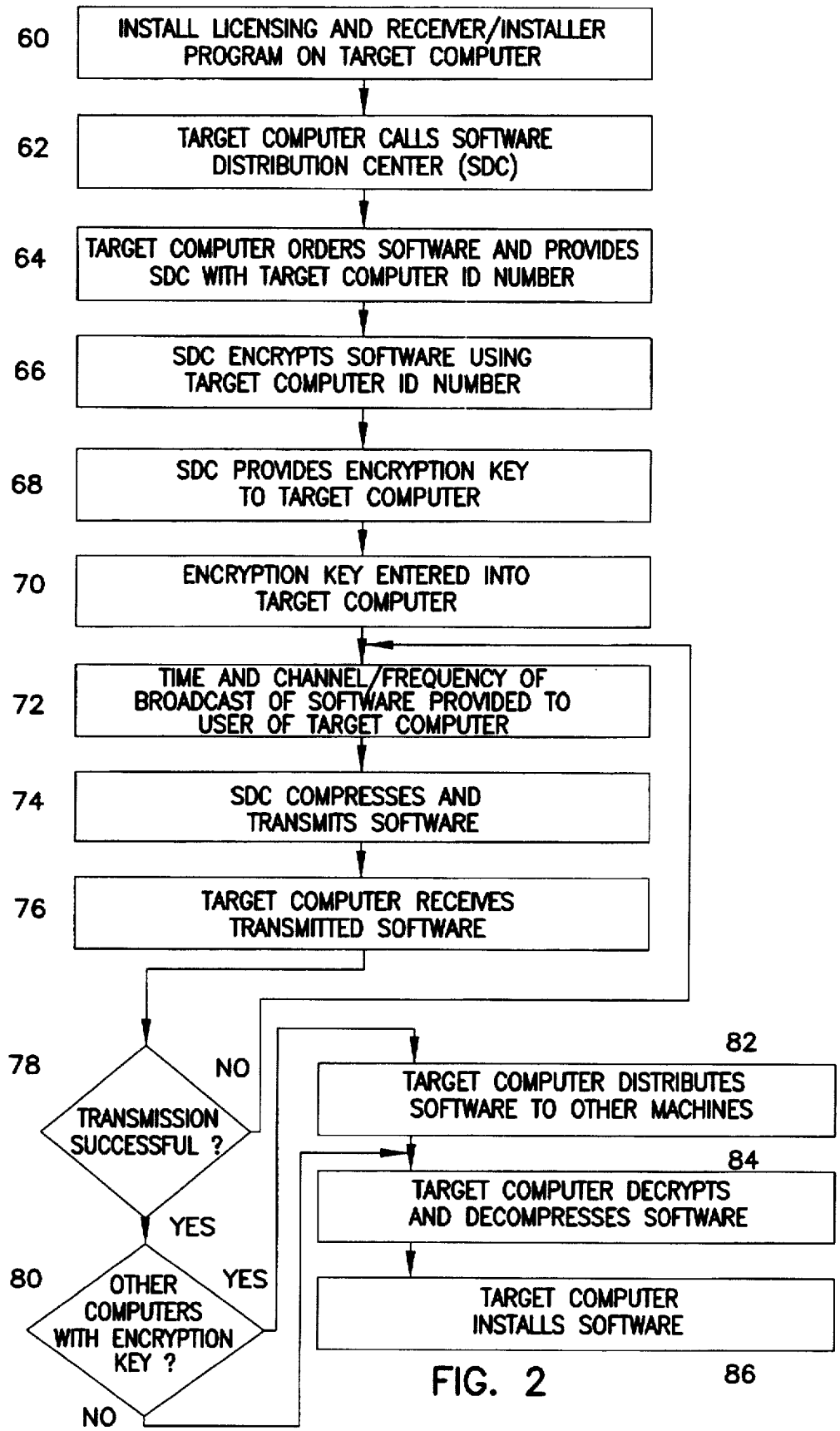
FIG. 2 is a flow chart illustrating exemplary steps which may be used to program the computer system of FIG. 1, according to the present invention.

Referring now to FIG. 2, a flow chart is illustrated detailing the steps which may be used to program the computer system of FIG. 1, with the host computer 10 transmitting a software package to a target computer 18 through a broadcast medium, according to the present invention. Block 30 represents installation of a licensing program and receiver/installer program on the target computer 18. As explained above, only users having this software on their computer receive software according to this invention; the encrypted software that is transmitted via satellite is otherwise unusable.

Blocks 32 and 34 represent the target computer 18 calling the SDC to order a particular software package. When the customer orders the software, the customer selects an option provided by the licensing program 22, which produces the identification code of the target computer 18. A customer gives his identification code to the operator receiving the software order at the SDC.

Block 36 represents the SDC encrypting the encryption key specific to the ordered software package. When the SDC receives the identification number of the target computer 18, it produces a new key (e.g., an ASCII string) by encrypting the software encryption key for the ordered software package using the identification code of the target computer 18. The purpose of the new key (i.e., the encrypted encryption key) is to lock a particular computer (e.g., the computer with the identification code used to encrypt the encryption key) to a particular software package. Instead of allowing any computer having the encryption key to listen to the broadcast and obtain software illegally, only the target computer 18 whose identification code is used to encrypt the software encryption key, accesses the transmitted software. As represented in block 38, the SDC provides the new key to the target computer 18. The SDC provides this string to the target computer 18, for example, via fax or e-mail.

Block 40 represents the user of the target computer 18 entering the encrypted encryption key (i.e., new key) onto the target computer 18. The installer/receiver program on the target computer 18 provides a user interface requesting the user to insert the new key provided by the SDC. The target computer 18 then stores this key.

Block 42 represents the SDC providing to the user of the target computer 18 the time and channel/frequency that the ordered software will be broadcast. Software products are broadcast from the SDC, for example, during scheduled timeslots. Preferably, popular products are broadcast at regular intervals, while relatively uncommon software products are periodically scheduled at the request of a user.

Block 44 represents transmission of the software from the SDC at the time and channel/frequency that was communicated to the user in block 42. The software is broadcast as one compressed file via satellite. The bits of the file are pushed out on the line in a manner similar, for example, to transmission over TCP/IP or modem.

Block 46 represents the target computer receiving the software that is broadcast via satellite. At the time specified for transmission, users "tune in" with their receivers to the specified frequency or channel. As an option, the receiver could be set up to look for and download a specific list of ordered products, or specific versions of a product. For example, a user may want to always download new versions of products that were already installed so that the user always has the latest version of the software product.

Block 48 represents checking whether the transmission is successful. If the transmission is not successful, then the SDC provides the user with the relevant information regarding the next broadcast of the software. The target computer 18 then waits until that time that the software is retransmitted and subsequently receives the software as described in connection with block 46. If the transmission is successful, then, as represented in block 50, the target computer decrypts the encrypted encryption key using its identification code. Once this is performed, the target computer decrypts the software using the encryption key specific to the software product.

The decryption of the software, represented in block 52, at the target computer 18 occurs as follows. The licensing program 22 generates the identification code of the target computer 18 which, in turn, is transmitted to the receiver/installer program on the target computer 18. In the alternative, the receiver/installer program itself generates the identification code. The receiver/installer program 14 on the target computer 18 utilizes this identification number to decrypt the encrypted encryption key. The encryption key in turn enables the target computer 18 to decrypt (i.e., unlock) the transmitted software. This process occurs virtually simultaneously, thereby making it extremely difficult to identify the encryption key during the process. Consequently, only the target computer 18 can decrypt the software.

Block 54 represents determining whether there are other peripheral computers to receive the software. If there are no peripheral computers, the target computer 18, as represented in blocks 56 and 58, decompresses and installs the software onto the target computer 18. Specifically, the installer/receiver program 24 invokes a routine to decrypt and decompress the temporary data file. This part of the installation copies files to the file destination with the appropriate permissions and ownership on the target computer 18. Moreover, it kicks off any installation scripts required to complete the installation, configuration, or tuning specific for the application installed.

As depicted in blocks 60, 62 and 64, if there are other peripheral computers connected to the target computer 18, then the target computer 18 distributes the software to the peripheral computers 20a–n which in turn decompress and install the software. As mentioned previously, each of the peripheral computers 20a–n has a receiver/installer software product to enable the decompression and installation of the software.

Figure 3:
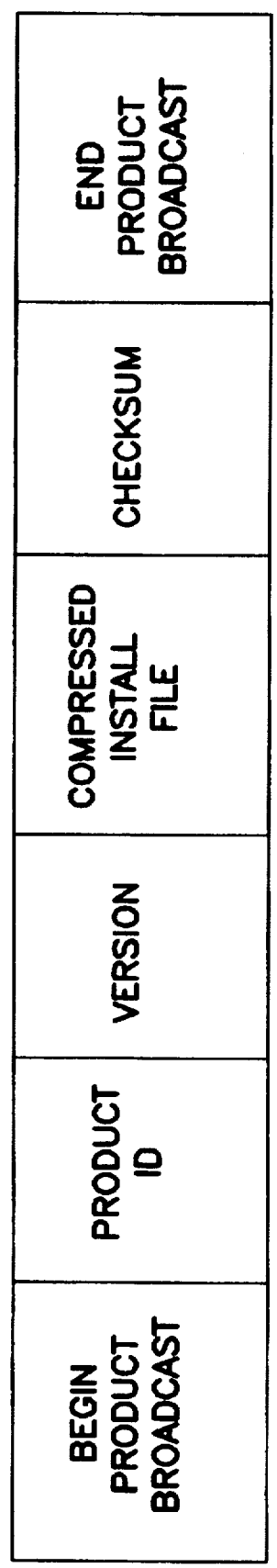
FIG. 3 illustrates the packets of a compressed file that are transmitted to a target computer in a broadcast session, according to the present invention.

Referring to FIG. 3, a compressed file for a software package is illustrated, having multiple packets. The compressed file, generally designated 70, includes a header 72, a compressed installable file packet 80, a checksum packet 82, and an end-product broadcast packet 84. The header 72 includes a begin product broadcast packet 74, a product identification packet 76 and a version packet 78. The begin product broadcast packet 74 signals the beginning of the transmission of a new software product. The product identification packet 76 identifies the software product that is transmitted. Version packet 78 identifies the particular version of the software product that is transmitted. For example, the version packet 78 notifies users when a software product upgrade is being transmitted. Other identifying information could also be included as part of the header 72. For example, there could be a vendor header packet to enable a target computer to monitor for all software products that a particular vendor offers.

Packet 80 in the compressed file contains the compressed installable file. This includes the compressed software and the configuration scripts.

Packet 82 is the checksum packet. As described in more detail below with the respect to FIG. 4, the checksum packet 82 enables the user at the target computer 18 to verify that the transmission is successful. The end product broadcast packet 84 notifies the target computer that the transmission is complete.

Figure 4:
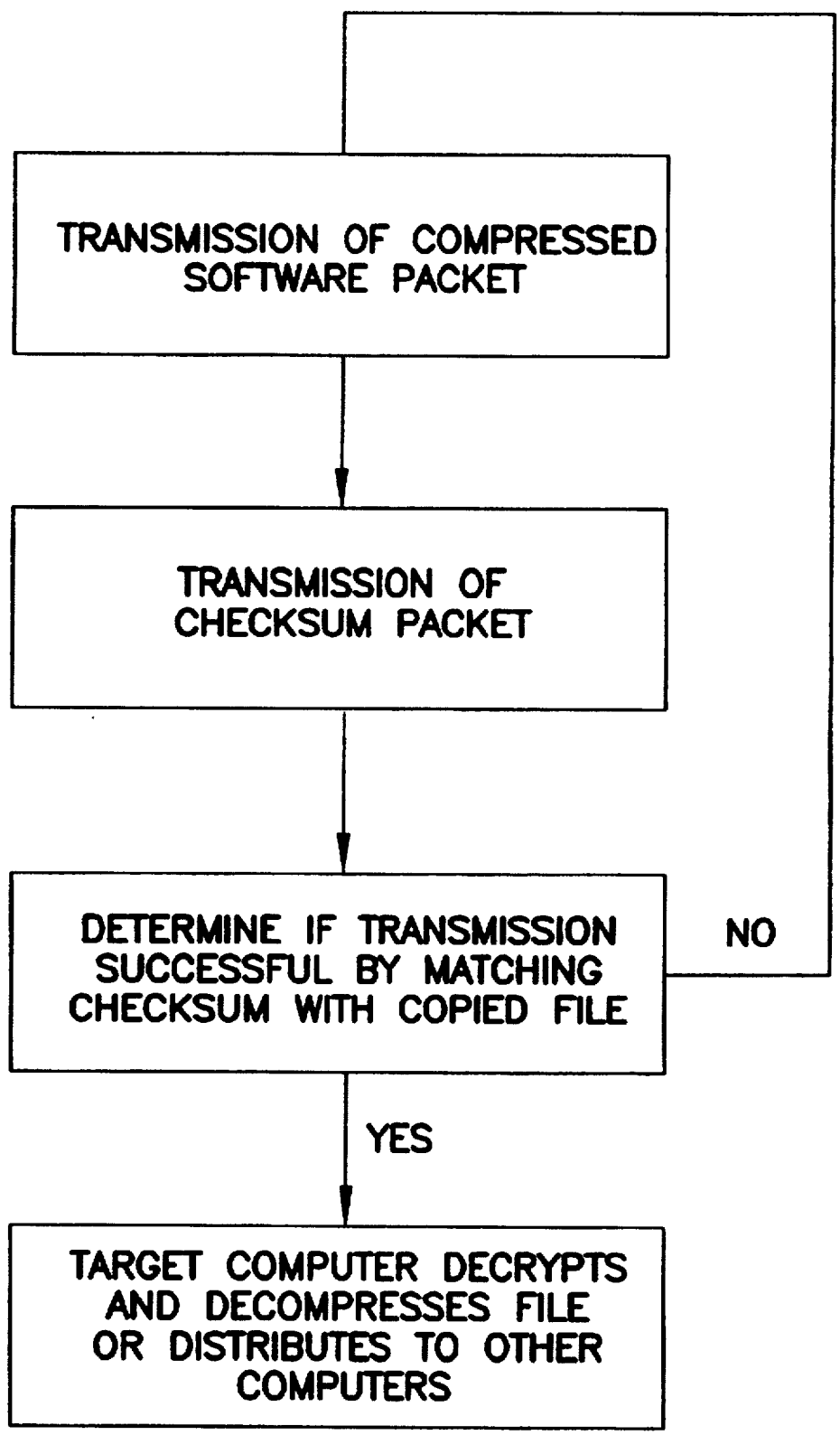
FIG. 4 is a flow chart illustrating exemplary steps, according to the present invention, for verifying that software has been successfully transmitted in the system of FIG. 1.

Referring now to FIG. 4, a flow chart illustrates the steps for verifying that the software is successfully transmitted. Block 90 represents the transmission of the compressed software contained in the compressed installable file packet 80. Block 92 represents transmission of the checksum packet 82. The checksum packet 82 is generated at the SDC when the software product is initially compressed and stored at the send computer. Based on the contents of the file received at the target computer 18, an algorithm contained in the receiver/installer program 24 generates a code or number based on the compressed file received at the target computer 18. This number, which is generated using the same algorithm that generates the checksum when the software is compressed, is compared to the checksum packet 82. If the transmission has been successful, the two numbers are the same. At block 94 of FIG. 4, it is determined whether the transmission is successful by matching the checksum packet 82 with the code generated by the file copied to the target computer 18. If the codes are the same, the target computer 18, as depicted in block 96, decrypts and decompresses the software and installs it on the target computer 18 or distributes it to other peripheral computers for decompression and installation. If the checksum packet 82 does not match the file that was received from the host computer 10, then the target computer 18 deletes the file and waits for retransmission of the software product.

Unlike the prior art which provides transmission through phone lines, the present invention is not limited in the number of customers who can receive a given transmission. Each customer who orders a particular software product receives the software from the same broadcast. Therefore, theoretically a single broadcast transmits to an unlimited amount of users.

The foregoing description of the preferred embodiment of the invention has been presented for the purposes of illustration and description. It is not intended to be exhaustive or to limit the invention to the precise form disclosed. Many modifications and variations are possible without departing from the scope of the invention as defined by the claims appended hereto.

What is claimed is:

1. A method of distributing software encrypted by a software encryption key to a target computer, comprising the steps of:

receiving a number unique to the target computer;

encrypting the software encryption key using the number unique to the target computer unique number;

transmitting the encrypted software encryption key to the target computer;

communicating a timeslot and channel for broadcasting the encrypted software to the target computer; and broadcasting a message at the communicated timeslot and channel, the message comprising the encrypted software.

2. The method of claim 1, wherein the broadcast timeslot is periodically scheduled according to a user request.

3. The method of claim 1, wherein the transmission timeslot is regularly scheduled.

4. The method of claim 1, wherein:

the message further comprises a version packet notifying the target computer that an upgraded version of the software is being transmitted and enabling the target computer to download upgraded versions of software already installed on the target computer; and the method further comprises the step of decrypting the software using the target computer unique number when the version indicator indicates that an upgraded version of software already installed on the target computer is being broadcast.

5. The method of claim 1, wherein:

the message further comprises a vendor header packet enabling the target computer to monitor broadcasts for software products offered by a vendor.

6. The method of claim 1, further comprising the steps of:

decrypting the software in the target computer using the target computer unique number;

determining if there are peripheral computers coupled to the target computer to receive the decrypted software; and distributing the decrypted software to the peripheral computers when there are peripheral computers coupled to the target computer to receive the decrypted software.

7. The method of claim 1, wherein the message further comprises a checksum packet for determining if the target computer received the encrypted software without error, and the method further comprises the steps of:

receiving the checksum packet in the target computer;

processing the checksum packet in the target computer to determine if the encrypted software was received without error;

providing the target computer information regarding a next broadcast of the software when the encrypted software was not received without error; and waiting for retransmission of the encrypted software.

8. An apparatus for distributing software encrypted by a software encryption key to a target computer, comprising:

means for receiving a number unique to the target computer;

means for encrypting the software encryption key using the number unique to the target computer unique number;

means for transmitting the encrypted software encryption key to the target computer;

means for communicating a timeslot and channel for broadcasting the encrypted software to the target computer; and means for broadcasting a message at the communicated timeslot and channel, the message comprising the encrypted software.

9. The apparatus of claim 8, wherein the means for providing a timeslot and channel for broadcasting the encrypted software to the target computer comprises means for periodically scheduling the timeslot according to a user request.

10. The apparatus of claim 8, wherein the means for providing a timeslot and channel for broadcasting the encrypted software to the target computer comprises means for regularly scheduling the transmission time.

11. The apparatus of claim 8, wherein:

the message further comprises a version packet notifying the target computer that an upgraded version of the software is being transmitted and enabling the target computer to download upgraded versions of software already installed on the target computer; and the apparatus further comprises means for decrypting the software using the target computer unique number when the version indicator indicates that an upgraded version of software already installed on the target computer is being broadcast.

12. The apparatus of claim 8,wherein the message further comprises a vendor header packet enabling the target computer to monitor broadcasts for software products offered by a vendor.

13. The apparatus of claim 8, further comprising:

means for decrypting the software in the target computer using the target computer unique number;

means for determining if there are peripheral computers coupled to the target computer to receive the decrypted software; and means for distributing the decrypted software to the peripheral computers when there are peripheral computers coupled to the target computer to receive the decrypted software.

14. The apparatus of claim 8, wherein the message further comprises a checksum packet for determining if the target computer received the encrypted software without error, and the apparatus further comprises:

means for receiving the checksum packet in the target computer;

means for processing the checksum packet in the target computer to determine if the encrypted software was received without error;

providing the target computer information regarding a next broadcast of the software when the encrypted software was not received without error; and waiting for retransmission of the encrypted software.

15. A program storage device, readable by computer, tangibly embodying one or more programs of instructions executable by the computer to perform method steps of distributing software encrypted by a software encryption key to a target computer, the method steps comprising the steps of:

receiving a number unique to the target computer;

encrypting the software encryption key using the number unique to the target computer unique number;

transmitting the encrypted software encryption key to the target computer;

communicating a timeslot and channel for broadcasting the encrypted software to the target computer; and broadcasting a message at the communicated timeslot and channel, the message comprising the encrypted software.

16. The program storage device of claim 15, wherein the broadcast timeslot is periodically scheduled according to a user request.

17. The program storage device of claim 15, wherein the transmission timeslot is regularly scheduled.

18. The program storage device of claim 15, wherein:

the message further comprises a version packet notifying the target computer that an upgraded version of the software is being transmitted and enabling the target computer to download upgraded versions of software already installed on the target computer; and the method steps further comprises the method step of decrypting the software using the target computer unique number when the version indicator indicates that an upgraded version of software already installed on the target computer is being broadcast.

19. The program storage device of claim 15, wherein:

the message further comprises a vendor header packet enabling the target computer to monitor broadcasts for software products offered by a vendor.

20. The program storage device of claim 15, wherein the method steps further comprise the method steps of:

decrypting the software in the target computer using the target computer unique number;

determining if there are peripheral computers coupled to the target computer to receive the decrypted software; and distributing the decrypted software to the peripheral computers when there are peripheral computers coupled to the target computer to receive the decrypted software.

21. The program storage device of claim 15, wherein the message further comprises a checksum packet for determining if the target computer received the encrypted software without error, and the method steps further comprise the method steps of:

receiving the checksum packet in the target computer;

processing the checksum packet in the target computer to determine if the encrypted software was received without error;

providing the target computer information regarding a next broadcast of the software when the encrypted software was not received without error; and waiting for retransmission of the encrypted software.

* * * * *